United States Patent
Niwamae et al.

(10) Patent No.: US 11,973,907 B2
(45) Date of Patent: Apr. 30, 2024

(54) READING APPARATUS AND PRINTING APPARATUS

(71) Applicant: CANON KABUSHIKI KAISHA, Tokyo (JP)

(72) Inventors: Yuki Niwamae, Kanagawa (JP); Hiroki Nakanishi, Tokyo (JP); Keitaro Tsuji, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/162,644

(22) Filed: Jan. 31, 2023

(65) Prior Publication Data

US 2023/0254423 A1   Aug. 10, 2023

(30) Foreign Application Priority Data

Feb. 10, 2022 (JP) .............................. 2022-019517

(51) Int. Cl.
*H04N 1/00*      (2006.01)
*B41J 29/02*     (2006.01)

(52) U.S. Cl.
CPC .......... *H04N 1/00551* (2013.01); *B41J 29/02* (2013.01); *H04N 2201/0063* (2013.01)

(58) Field of Classification Search
CPC ... G09G 2310/0254; G09G 2320/0233; G09G 2320/0295; G09G 2320/043; G09G 2320/045; G09G 3/3233; G09G 3/3291; G09G 3/32; H04N 1/00551; H04N 1/0402
USPC ....................................................... 358/474
See application file for complete search history.

(56) References Cited

U.S. PATENT DOCUMENTS

| | | | | |
|---|---|---|---|---|
| 2004/0169894 A1* | 9/2004 | Schroath | ............. | H04N 1/1013 358/488 |
| 2007/0071492 A1* | 3/2007 | Ito | ..................... | H04N 1/00519 399/107 |
| 2007/0201111 A1* | 8/2007 | Osakabe | ............ | H04N 1/00551 358/497 |
| 2009/0147324 A1* | 6/2009 | Tamura | ............. | H04N 1/00519 358/498 |
| 2009/0168112 A1* | 7/2009 | Muraki | ............. | H04N 1/00496 345/30 |
| 2013/0057933 A1* | 3/2013 | Osakabe | ............ | H04N 1/00551 358/474 |

(Continued)

FOREIGN PATENT DOCUMENTS

| | | |
|---|---|---|
| JP | 2010-006033 | 1/2010 |
| JP | 2015-061114 | 3/2015 |

*Primary Examiner* — Negussie Worku
(74) *Attorney, Agent, or Firm* — Venable LLP

(57) ABSTRACT

A reading apparatus includes: a document platen on which a document is placed; a reading portion configured to read a document placed on the document platen; a cover that is openable and closable between a first position at which the document platen is covered and a second position at which the document is uncovered; and a frame member including a first inclination portion and a second inclination portion, configured to constitute at least a part of an outer frame of the document platen, the first inclination portion being adjacent to the document platen and higher with an increasing distance from the document platen, and the second inclination portion being arranged farther away from the document platen than the first inclination portion and higher with an increasing distance from the document platen.

20 Claims, 18 Drawing Sheets

(56) References Cited

U.S. PATENT DOCUMENTS

| | | | |
|---|---|---|---|
| 2013/0063750 A1* | 3/2013 | Osakabe | H04N 1/00591 |
| | | | 358/1.13 |
| 2015/0077815 A1* | 3/2015 | Okazawa | H04N 1/00551 |
| | | | 358/474 |
| 2016/0212286 A1* | 7/2016 | Kawamata | B41J 29/13 |
| 2019/0364163 A1* | 11/2019 | Nakayama | H04N 1/00572 |
| 2022/0111671 A1* | 4/2022 | Tokuyama | B41J 29/13 |
| 2022/0345577 A1* | 10/2022 | Fukuda | H04N 1/00551 |

* cited by examiner

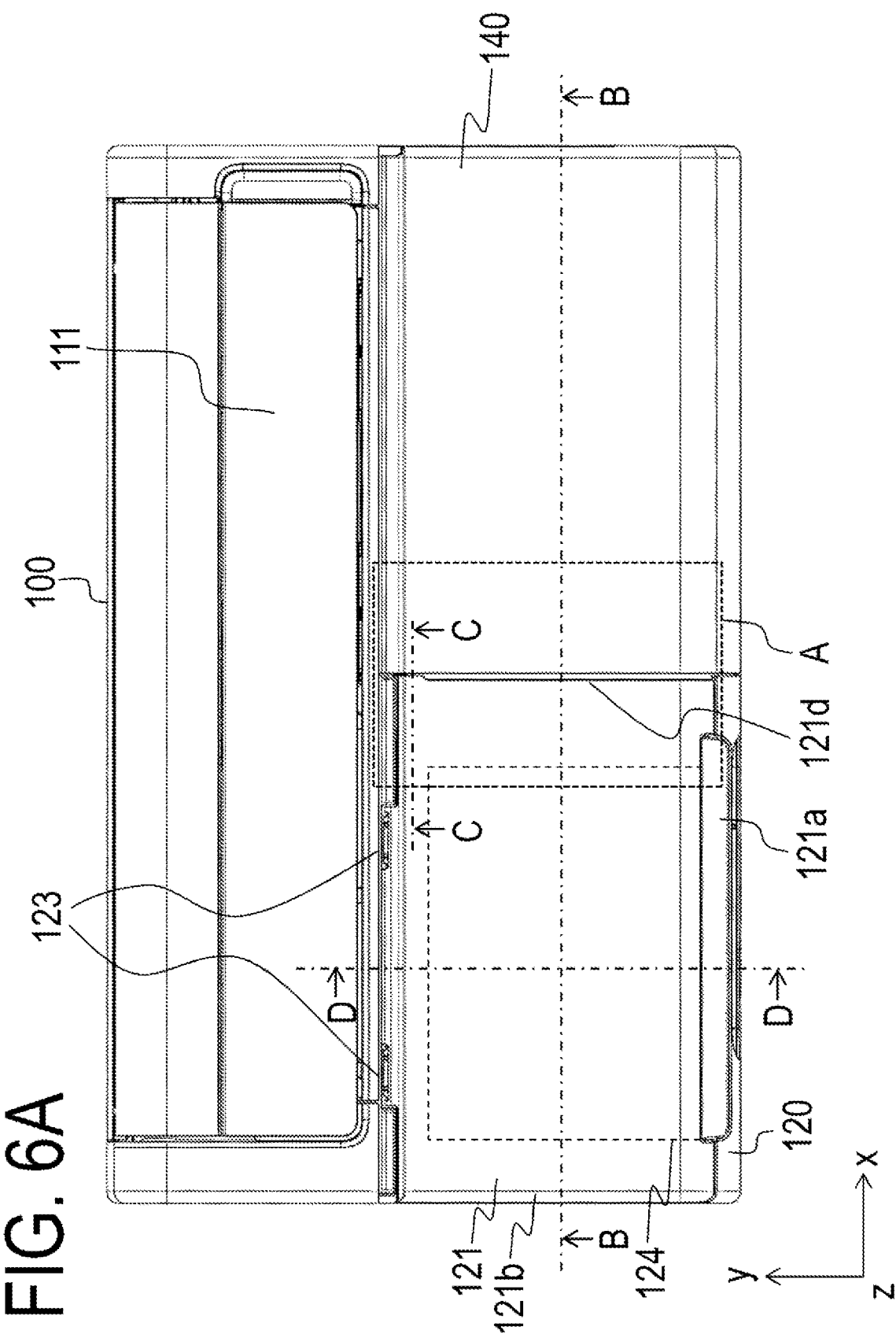

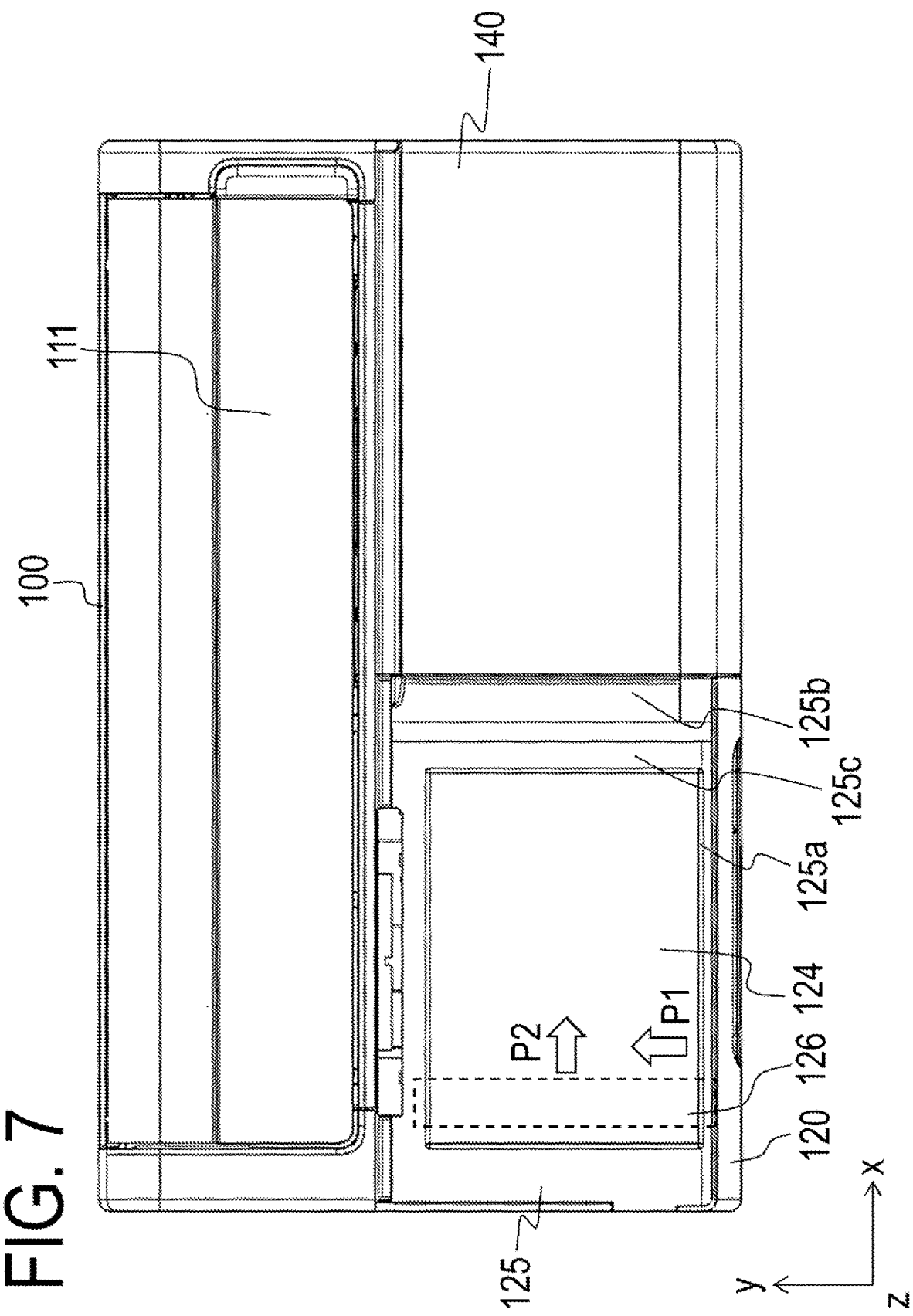

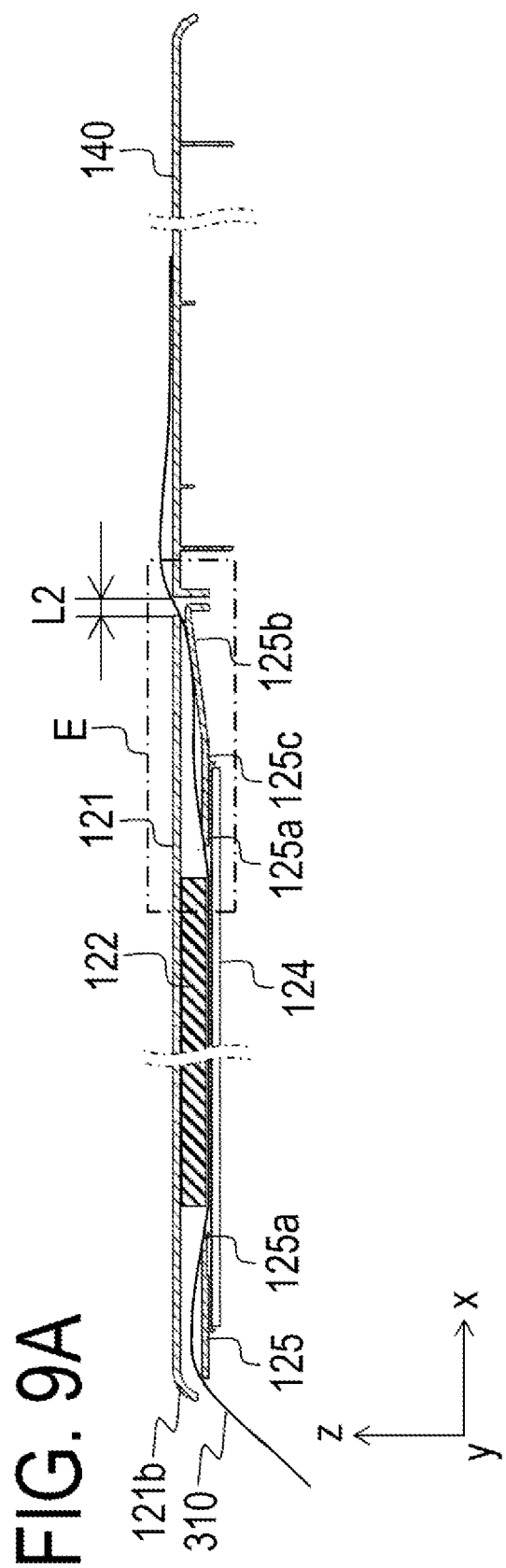

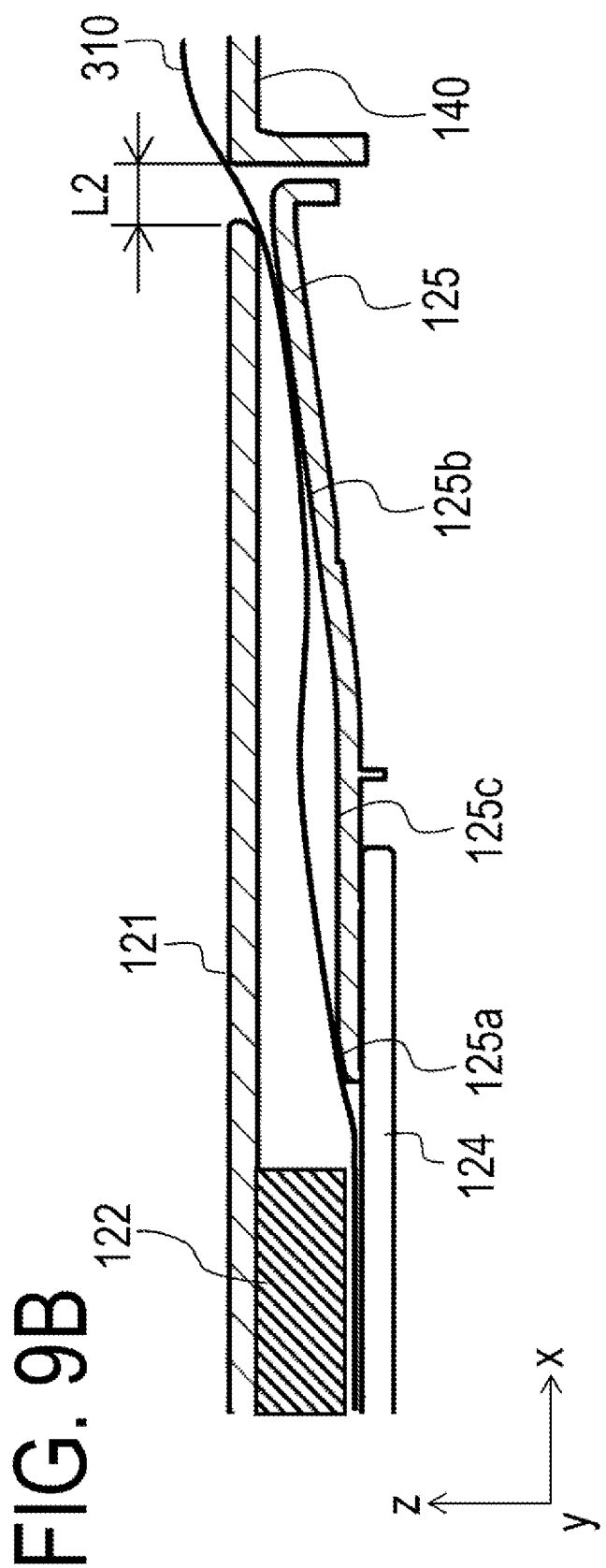

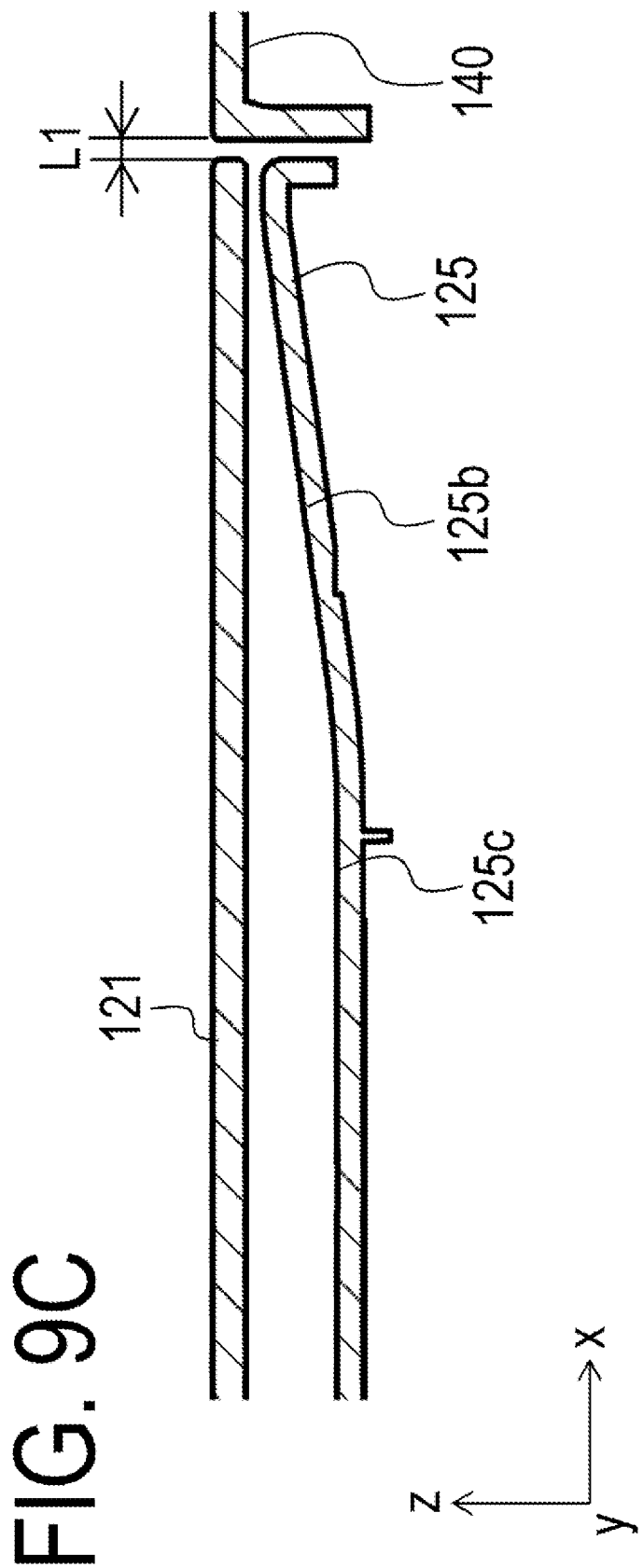

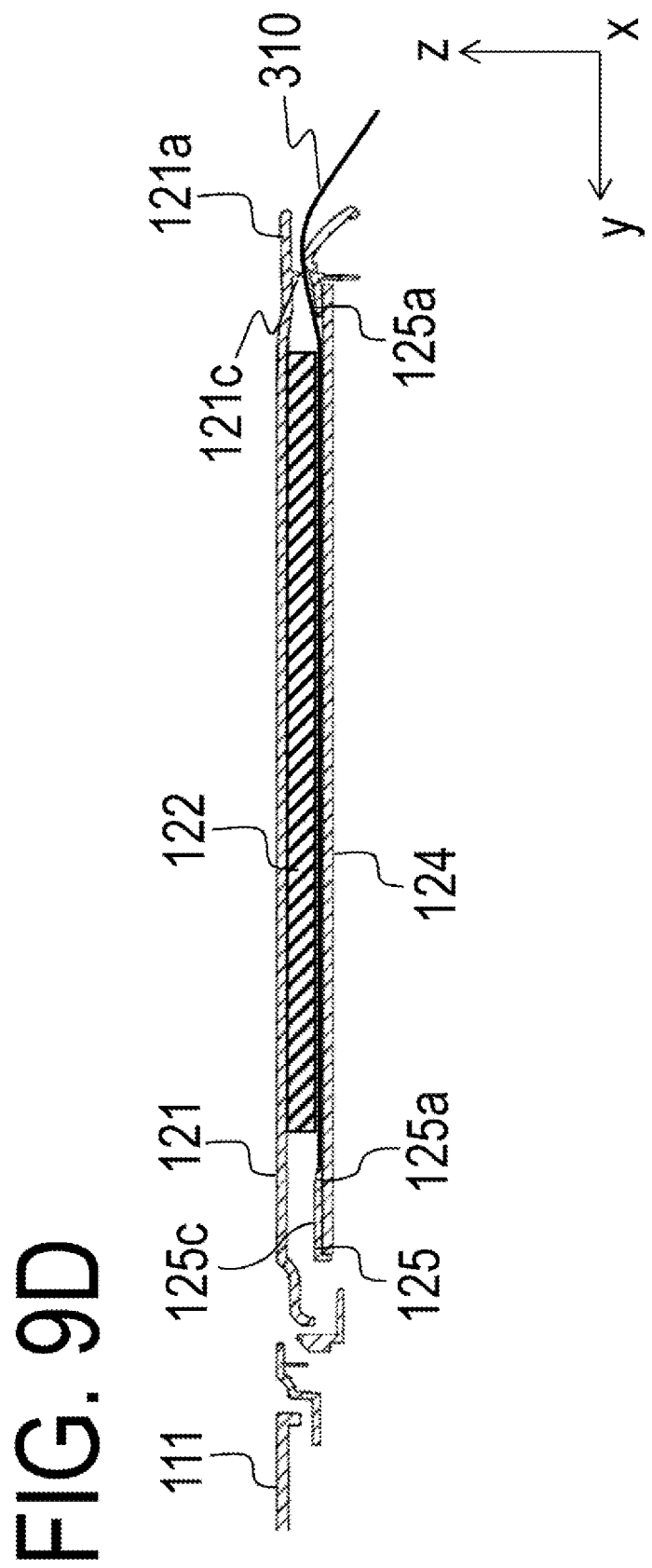

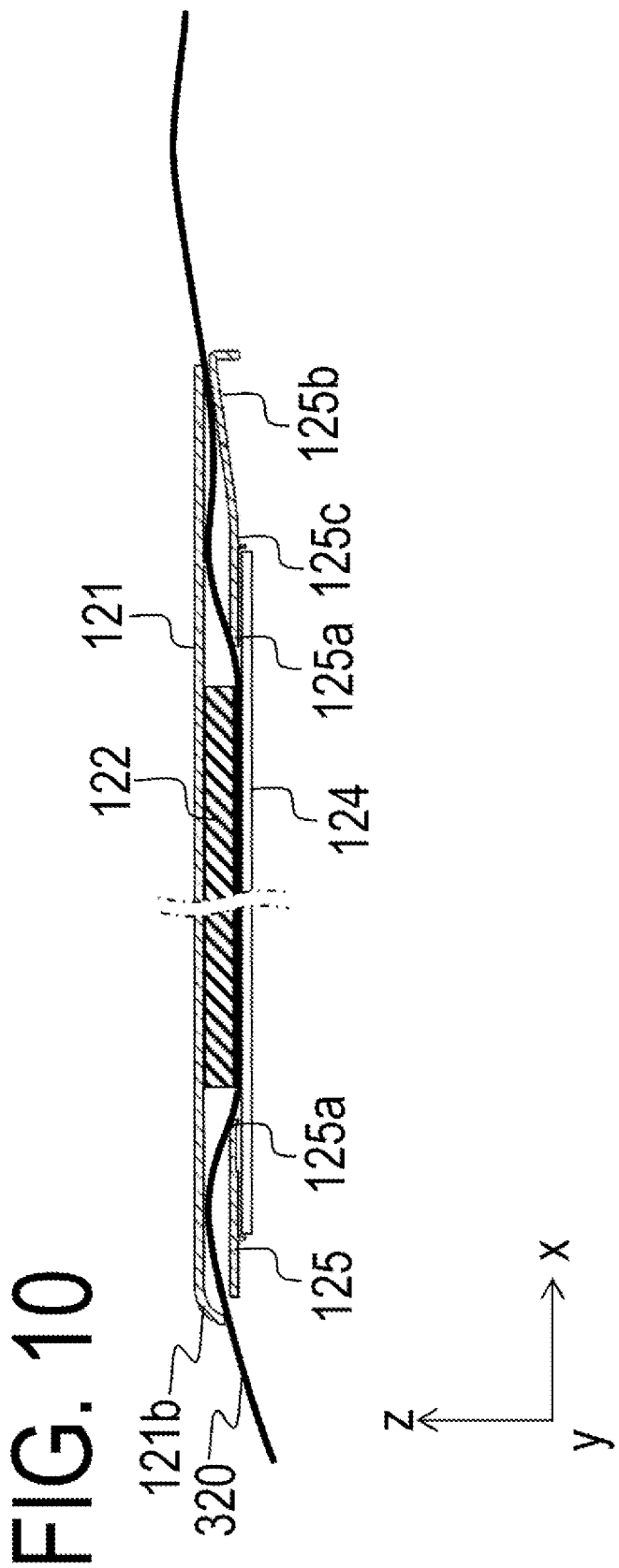

READING APPARATUS AND PRINTING APPARATUS

BACKGROUND OF THE INVENTION

Field of the Invention

The present invention relates to a reading apparatus that reads an image of a document placed on a document platen.

Description of the Related Art

A Multi Function Printers (hereinafter called MFP), in which a reading apparatus and a printing apparatus (recording apparatus) are integrated together, has been known as an image forming apparatus (Japanese Patent Application Laid-open No. 2010-6033), and various configurations of such an apparatus has been proposed. An MFP described in Japanese Patent Application Laid-open No. 2010-6033 has a configuration including a reading apparatus having thereon a cover that covers openably and closably a document platen, and the frame body of an interface panel including a display portion, an operation portion, or the like provided adjacent to the cover. The MFP is formed so that the closed cover and the frame body of the interface panel are the same in height, whereby the appearance of the apparatus maintains a sense of unity in terms of design. Further, Japanese Patent Application Laid-open No. 2015-61114 describes an MFP in which a gap for enabling the insertion of a document is formed between two hinges that rotatably support a cover, whereby a document larger than a document platen is capable of passing through the gap when the document is read by a reading apparatus.

SUMMARY OF THE INVENTION

Here, in the MFP, which is described in Japanese Patent Application Laid-open No. 2010-6033 and in which the cover and the frame body are formed to be the same in height, a document protruding from the document platen is placed on the frame body when the document larger than the document platen is read by the reading apparatus. Therefore, there is a possibility that when the cover is closed and the document is sandwiched between the cover and the frame body, an unintended fold is created in the document. Further, in the MFP described in Japanese Patent Application Laid-open No. 2015-61114, when a document lager than the document platen is read, the readable size of a document is limited to a size at which the document is enabled to pass through the gap between the hinges supporting the cover. Accordingly, the apparatus has to be upsized in order to widen the range of an adaptable document size.

The present invention has an object of providing a technology that makes it possible to read a document larger in size than a document platen without upsizing an apparatus.

In order to achieve the above object, a reading apparatus according to the present invention includes the following:
a document platen on which a document is placed;
a reading portion configured to read the document placed on the document platen;
a cover that is openable and closable between a first position at which the document platen is covered and a second position at which the document platen is uncovered; and
a frame member including a first inclination portion and a second inclination portion, configured to constitute at least a part of an outer frame of the document platen, the first inclination portion being adjacent to the document platen and higher with an increasing distance from the document platen, and the second inclination portion being arranged farther away from the document platen than the first inclination portion and higher with an increasing distance from the document platen.

According to the present invention, it is possible to read a document larger in size than a document platen without upsizing an apparatus.

Further features of the present invention will become apparent from the following description of exemplary embodiments with reference to the attached drawings.

BRIEF DESCRIPTION OF THE DRAWINGS

FIG. 6A is a top view of the MFP according to Example 1;
FIG. 7 is a top view of the MFP according to Example 1;
FIG. 9A is a cross-sectional view of the scanner portion and the frame body of the MFP of Example 1;
FIG. 9B is a cross-sectional view of the scanner portion and the frame body of the MFP of Example 1;
FIG. 9C is a cross-sectional view of the scanner portion and the frame body of the MFP of Example 1;
FIG. 9D is a cross-sectional view of the scanner portion and the frame body of the MFP of Example 1;
FIG. 10 is a cross-sectional view of the scanner portion of the MFP of Example 1.

DESCRIPTION OF THE EMBODIMENTS

With reference to the drawings, an embodiment for carrying out the present invention will be exemplified in detail below on the basis of Examples. Note that the dimensions, materials, shapes, their relative arrangement, or the like of constituting components described in the embodiment should be appropriately changed depending on the configurations or various conditions to which the present invention is applied. That is, the scope of the present invention is not limited to the following embodiment. The embodiment describes a plurality of characteristics. However, all the plurality of characteristics are not necessary for the present invention, and the plurality of characteristics may be arbitrarily combined together. In addition, the same or similar configurations are denoted by the same reference signs in the accompanying drawings, and their duplicated descriptions will be omitted.

Example 1

Figure 1:
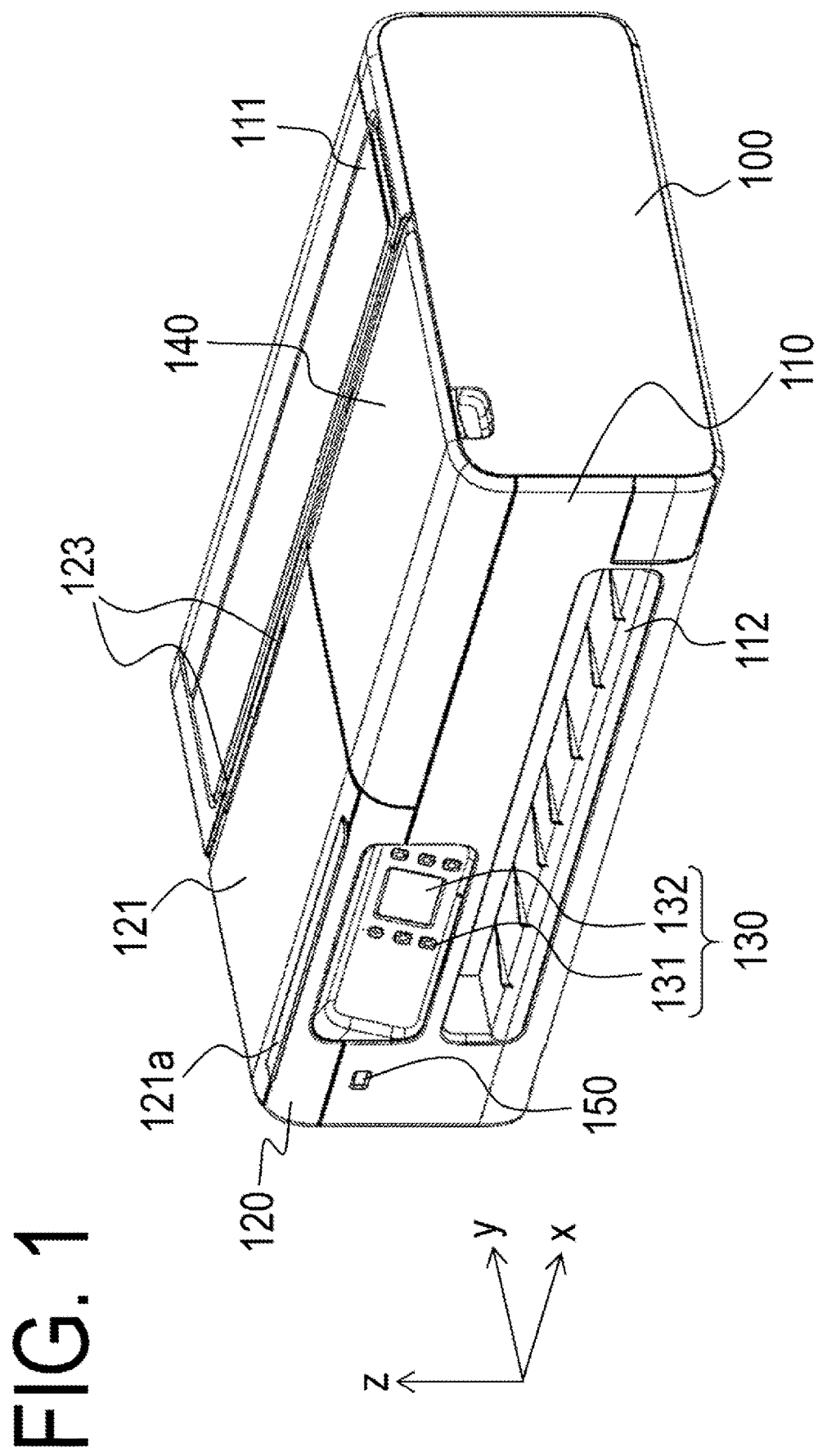
FIG. 1 is an appearance perspective view of an MFP according to Example 1.
Figure 2:
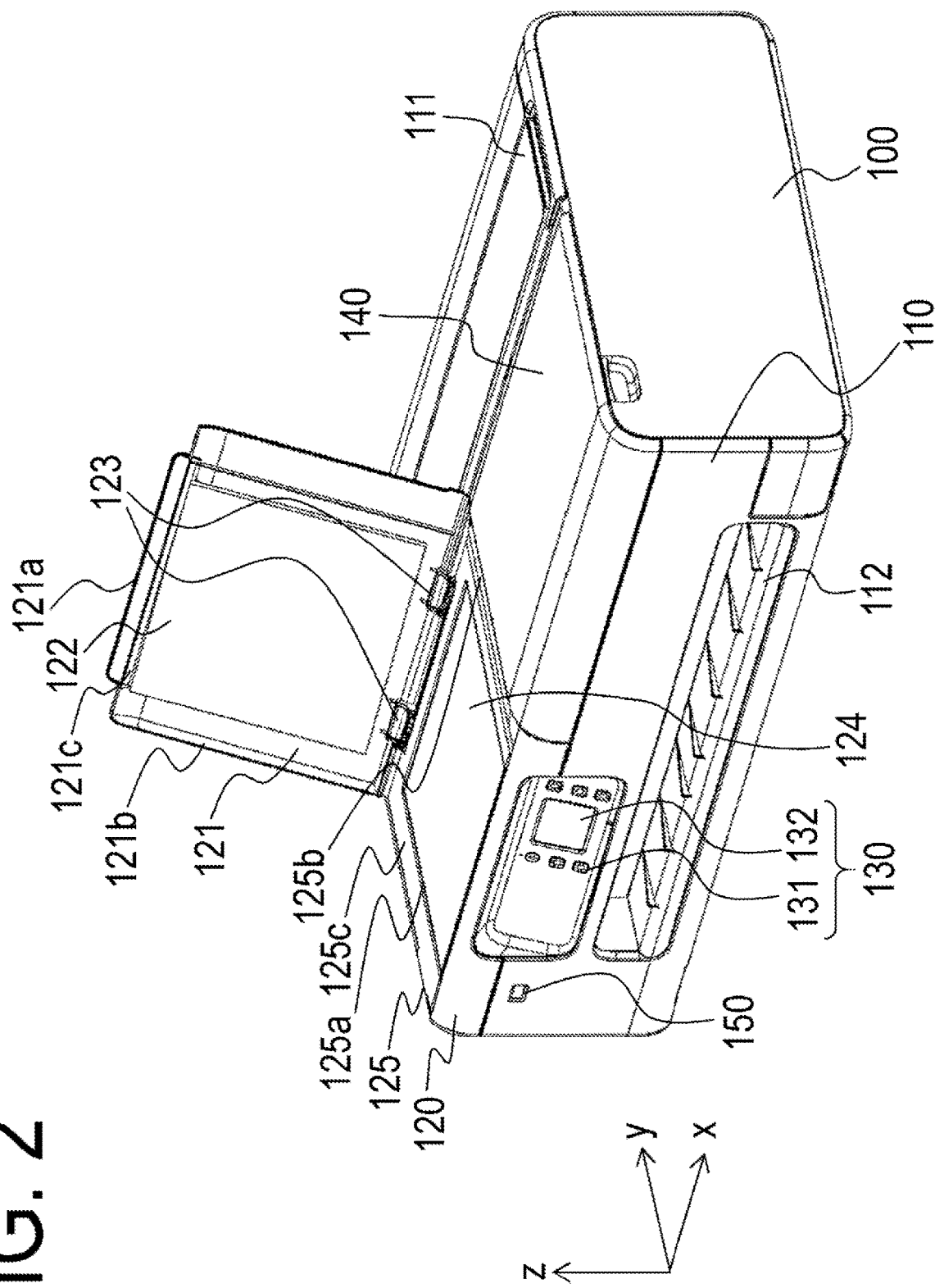
FIG. 2 is an appearance perspective view of the MFP according to Example 1.

FIG. 1 is an appearance perspective view of an MFP 100 according to Example 1 of the present invention, and is a view of the MFP 100 when seen from its front side with a scanner cover 121 and an exterior member 140 closed. FIG. 2 is an appearance perspective view of the MFP 100 according to Example 1 of the present invention, and is a view of the MFP 100 when seen from the front side with the scanner cover 121 opened and the exterior member 140 closed.

Note that FIG. 1, FIG. 2, and respective figures that will be described later show, as the generally-assumed installation state of an MFP, configuration arrangement in a state in which the MFP 100 is installed on a horizontal installation surface. That is, an X-Y-Z orthogonal coordinate system shown in the respective figures corresponds to a horizontal direction in which an X direction and a Y direction are orthogonal to each other. Particularly, the X direction shows the width direction (right-left direction) of the MFP 100, and the Y direction shows the depth direction (a −Y direction shows the near or front side of the apparatus, and a +Y direction shows the back or rear side thereof) of the MFP 100. Further, a Z direction corresponds to the vertical direction (a +Z direction shows the upward direction, and a −Z direction shows the downward direction) of the apparatus. That is, the Z direction corresponds to the height direction, gravity direction, or vertical direction of the apparatus.

The MFP 100 is mainly constituted by a printer portion 110 serving as a printing portion (printing apparatus) that prints an image on a printing material and a scanner portion 120 serving as a reading portion (reading apparatus) that reads an image from a document. The printer portion 110 is so-called an inkjet type serial printer that ejects ink serving as a printing liquid on a printing material such as a paper and a sheet to perform printing. Note that the printer portion 110 is not limited to an inkjet type but may be, for example, an electrophotographic printing portion. The scanner portion 120 is a flat head scanner of a CCD reading type. The MFP 100 of this Example has the scanner portion 120 at the upper part of the printer portion 110 serving as a printing portion that performs inkjet printing. Further, the MFP 100 has a user interface portion (hereinafter called a UI portion) 130 on its front surface. In the UI portion 130, an operation portion 131 that includes a power button, an operation button used to perform various printing settings, or the like and that is used by a user (operator) to input instructions to perform various operations to the MFP 100 and a display screen 132 that displays various information for the user such as printing setting contents, various guide displays, or the like are arranged.

As shown in FIG. 1, the printer portion 110 has a paper setting cover 111, a paper discharging port 112, and the exterior member 140 that constitutes a part of the exterior of the MFP 100 and is configured to be openable and closable. The paper setting cover 111 is used to set a printing material such as a printing paper on the rear side of the scanner portion 120. The paper discharging port 112 is provided on the front side of the MFP 100 and discharges a paper having been printed by the printer portion 110. The exterior member 140 is provided to be openable and closable on the outside of the scanner portion 120 in the sub-scanning direction (first direction) of a reading unit that will be described later. The exterior member 140 is usually closed as shown in FIG. 1. However, as will be described later, the exterior member 140 exposes the inside of the MFP 100 and enables paper jam processing, printer head maintenance, or the like when opened.

As shown in FIG. 1, the scanner portion 120 includes the scanner cover 121 on the upper surface of the MFP 100. The scanner cover 121 is rotatably supported by hinge portions 123 and configured to be openable and closable between a closed position (first position) at which the document platen of the scanner portion 120 is covered and an uncovered position (second position) at which the document platen of the scanner portion 120 is uncovered. As shown in FIG. 1, the scanner cover 121 and the exterior member 140 have surfaces that are the same in height in their closed states and maintain a sense of unity in terms of design.

As shown in FIG. 2, the scanner portion 120 includes a contact glass 124 serving as a document platen and a supporting member (frame member) 125 constituting an outer frame surrounding the periphery of the contact glass 124. The contact glass 124 plays a role in smoothening the surface of a document and maintaining a constant distance between the reading unit that will be described later and the document. The supporting member 125 is formed into a substantially rectangular frame shape and has a portion overlapping the outer periphery of the upper surface of the contact glass 124 so that its inner peripheral end defines a substantially rectangular document placement region on the upper surface of the contact glass 124 (see FIGS. 9A and 9B). The overlapping portion on the inner peripheral side of the supporting member 125 forms a step onto which the edge of a document placed on the contact glass 124 is abutted, and a first inclination portion 125a inclined to be higher with a distance from the document placement region with the edge of the step as a starting point is formed to surround the document placement region. Further, a second inclination portion 125b inclined to be higher toward the exterior member 140 is formed on a side along the exterior member 140 among four sides constituting the substantially rectangular frame shape of the supporting member 125. Further, a flat surface portion 125c having a surface parallel to the upper surface of the contact glass 124 is formed on the outside of the first inclination portion 125a (on the side opposite to the side adjacent to the contact glass 124) including a region between the first inclination portion 125a and the second inclination portion 125b. The first inclination portion 125a is formed to make a document placed on the contact glass 124 easily picked up, and the second inclination portion 125b is formed so that a document larger than the document placement region of the contact glass 124 is placed as will be described later.

The scanner cover 121 is provided with a gripping portion 121a, a bending portion 121b, and a protruding portion 121c. The gripping portion 121a protrudes to the front side in the closed state of the scanner cover 121 so that a user easily inserts his/her hand and raises the scanner cover 121. The bending portion 121b and the protruding portion 121c are formed on sides along the outer shape of the MFP 100 and have a shape bent to the side of the contact glass 124 to prevent light from entering the reading unit as will be described later. The two hinge portions 123 are arranged inside both ends of the document placement region of the contact glass 124 in the X direction.

When performing the reading processing of a document, the user opens the scanner cover 121 openable and closable with the hinge portions 123 as rotation shafts so that its attitude changes from an attitude at a closed position shown in FIG. 1 to an attitude at an opening position shown in FIG. 2. Thus, an area above the document placement region of the contact glass 124 is opened, which makes it possible for the user to set the document in the document placement region. Then, the user places the document on the contact glass 124 so that its surface to be read opposes the document placement region of the contact glass 124, and the scanner cover 121 is closed with the edge of the document abutted onto the step of the supporting member 125. The scanner cover 121 functions also as a pressing plate that presses the document set on the contact glass 124. A sponge-shaped white sheet 122 is attached to the surface of the scanner cover 121 that contacts the contact glass 124 and serves to make a reading image at a portion at which the document is not present sits well with the document region.

A USB portion 150 is provided on the front side of the MFP 100 and connected to a host computer not shown.

Figure 3:
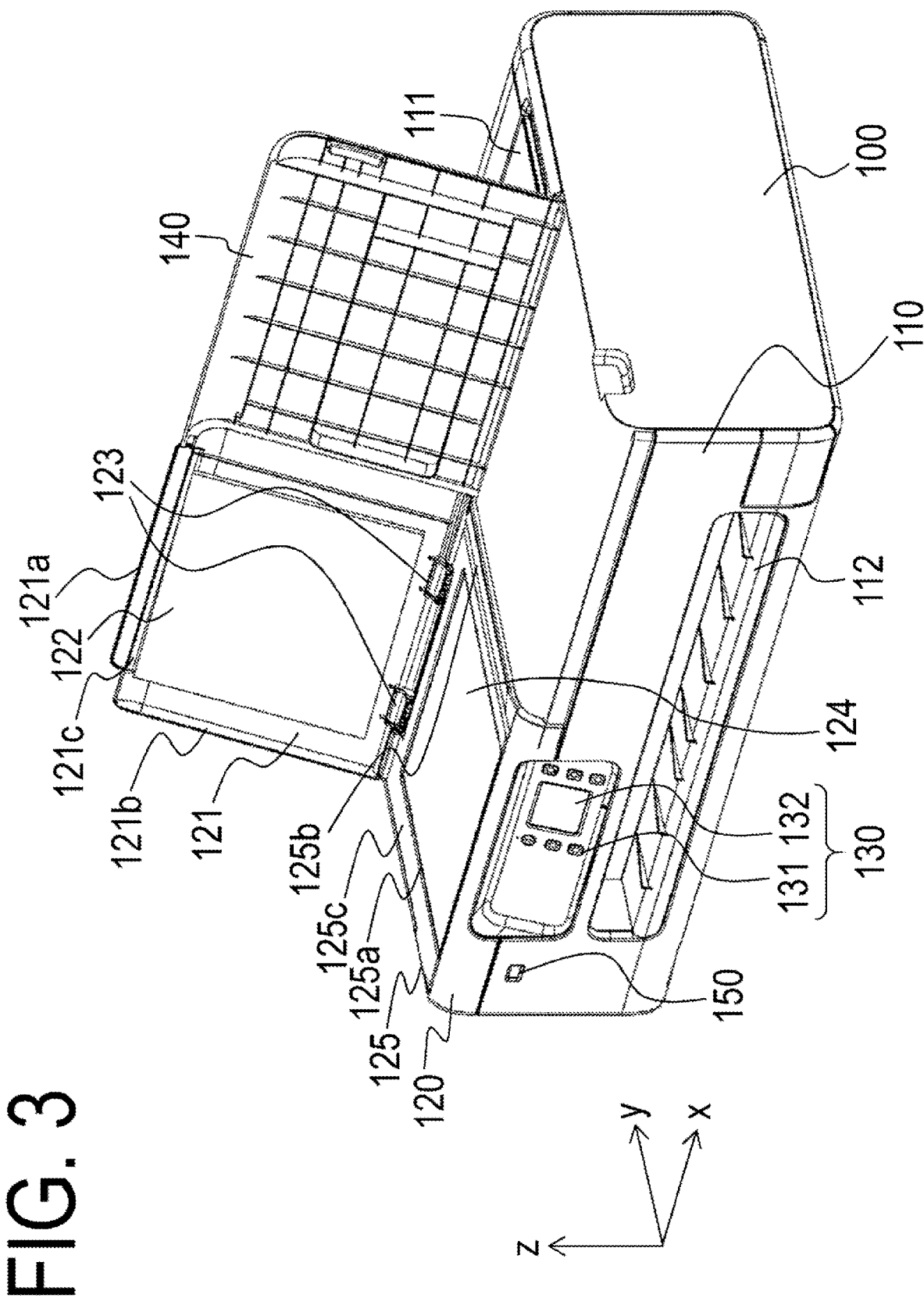
FIG. 3 is an appearance perspective view of the MFP according to Example 1.

FIG. 3 is an appearance perspective view of the MFP 100 according to this Example, and is a view of the MFP 100 when seen from the front side with the scanner cover 121 and the exterior member 140 opened. When the exterior member 140 is opened as shown in FIG. 3, it is possible to expose the inside of the MFP 100 for paper jam processing, printer head maintenance, or the like in the printing portion (not shown) of the printer portion 110.

Figure 4:
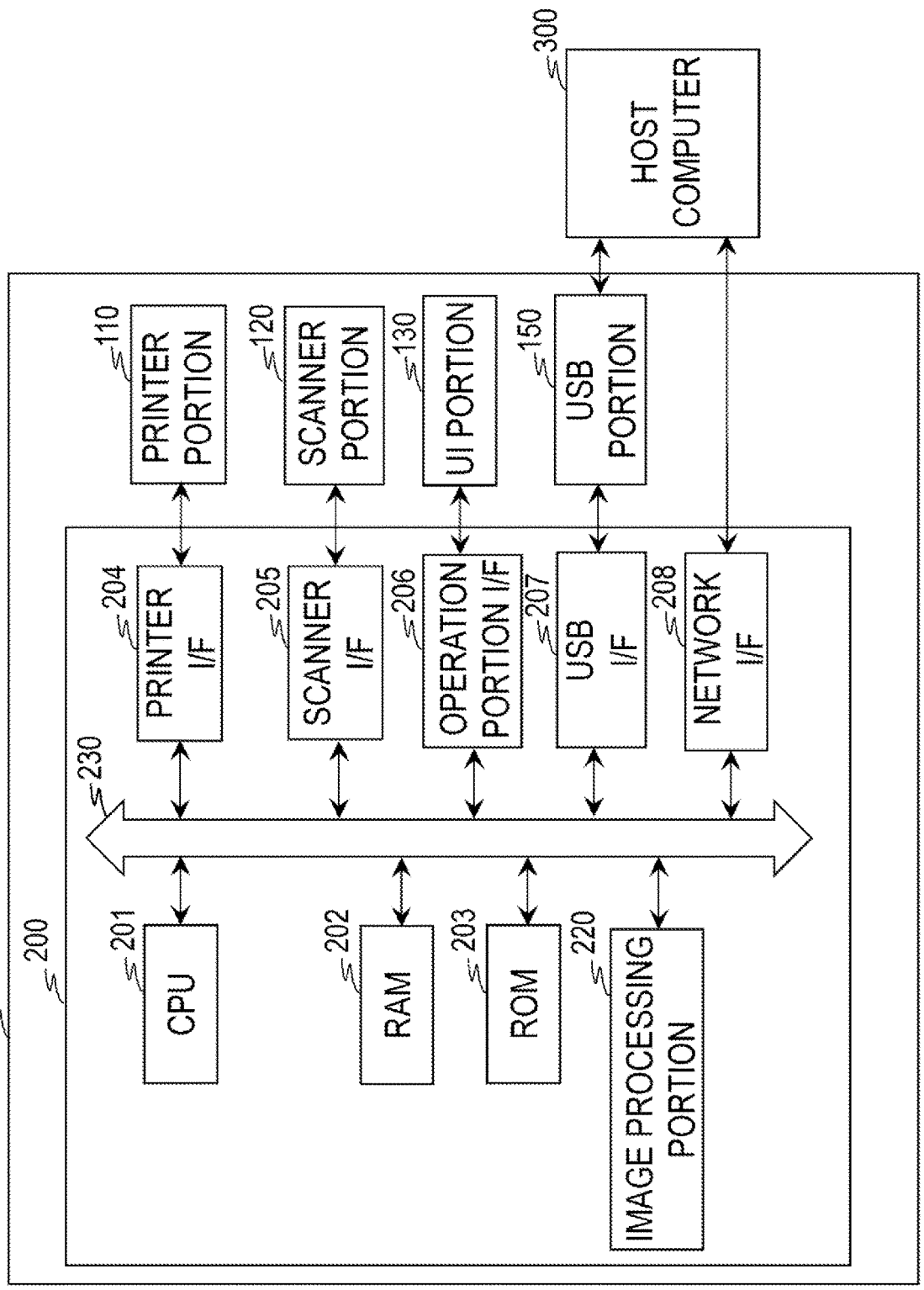
FIG. 4 is a block diagram of the control configuration of the MFP according to Example 1.

FIG. 4 is a block diagram for describing the control configuration of the MFP 100 according to this Example. A control portion 200 includes mechanisms to control the printer portion 110 that performs a printing operation, a scanner portion 120 that performs a reading operation, and a UI portion 130 such as an operation portion 131 and a display screen 132.

A Central Processing Unit (CPU) 201 controls the respective mechanisms inside the apparatus according to a control program or various setting information stored in a ROM 203. A RAM 202 is a main storage memory of the CPU 201 and used as a work area or a region that temporarily retain contents stored in the ROM 203. A flash storage or the like is used as the ROM 203 of this Example, but an auxiliary storage device such as a hard disk may be provided.

A printer I/F 204 controls the printer portion 110 according to instructions from the CPU 201. Image data processed by an image processing portion 220 and stored in the RAM 202 is transferred to the printer portion 110 via the printer I/F 204, and the printer portion 110 prints an image according to the image data. A scanner I/F 205 controls a scanner portion 120 according to instructions from the CPU 201. Image data read by the scanner portion 120 is transferred to the control portion 200 via the scanner I/F 205. An operation portion I/F 206 controls a UI portion 130 according to instructions from the CPU 201. For example, the operation portion I/F 206 transfers a command input by a user via the operation portion 131 of the UI portion 130 to the CPU 201 or displays the state of the printer portion 110 or the scanner portion 120 on a display screen 132 of the UI portion 130. A USB I/F 207 controls the communication with a host computer 300 that is externally connected via a USB portion 150. A network I/F 208 controls the communication between the control portion 200 and the host computer 300 externally connected.

The image processing portion 220 converts image data acquired by the scanner portion 120 into image data printable by the printer portion 110 or image data transferrable to the host computer 300. Particularly, when performing the image processing of acquired image data on the RAM 202 according to a control program stored in the ROM 203, the image processing portion 220 is used as a hardware function to perform the processing of a large load at a high speed.

The constituting elements 201 to 208 and 220 are connected to each other via a bus line 230. Note that FIG. 4 shows a mode in which the one CPU 201 controls the entire apparatus using one memory (the RAM 202). However, a mode in which a plurality of CPUs control the entire apparatus by causing a plurality of memories such as a RAM, a ROM, and a storage to cooperate with each other may be employed. Further, a plurality of dedicated hardware configurations like the image processing portion 220 may be provided.

Figure 5:
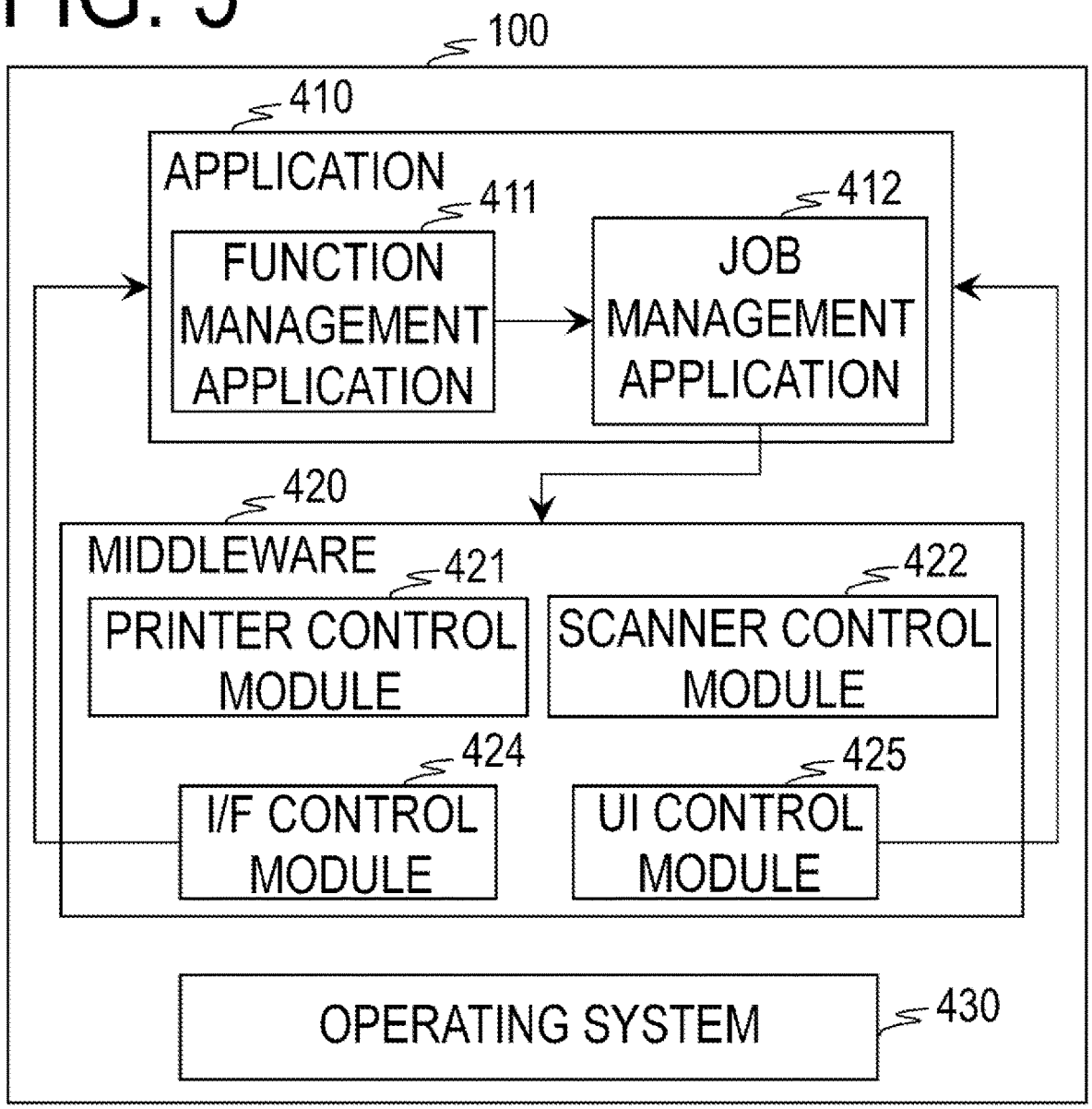
FIG. 5 is a block diagram of the software control configuration of the MFP according to Example 1.

FIG. 5 is a block diagram for describing a software control configuration in the MFP 100 according to this Example. The control program of the MFP 100 may be roughly divided into an application 410, middleware 420, and an operating system 430. The operating system 430 offers a basic function to run a control program in the control portion 200. The application 410 causes respective devices to operate via individual modules included in the middleware 420 to realize a function such as a copying function offered to a user by the MFP 100. Note that processing realized by respective software is realized when the CPU 201 reads various programs corresponding to the respective software stored in a memory such as the ROM 203 into the RAM 202 and runs the read programs.

The middleware 420 is constituted by software modules that control an I/F with respect to individual devices. In this Example, a printer control module 421 that controls a printer I/F 204 and a scanner control module 422 that controls a scanner I/F 205 are provided. Further, an I/F control module 424 that controls the USB I/F 207 for communication with the host computer 300 and the network I/F 208 and a UI control module 425 that controls the operation portion I/F 206 for communication with the UI portion 130 are also provided.

For example, when the user inputs a "copy" command through the operation portion 131, the UI control module 425 detects the input command and notifies the application 410 of the same. In the application 410, a function management application (hereinafter called a function management APL) 411 generates a scan job and a print job on the basis of a "copy" job and notifies a job management application (hereinafter called a job management APL) 412 of the generated jobs. The job management APL 412 causes the scanner portion 120 to perform a scan operation using the scanner control module 422 of the middleware 420 and stores acquired image data in the RAM 202. On this occasion, the image processing portion 220 is used when any image processing or correction is needed.

When image data is accumulated in the RAM 202, the job management APL 412 next causes the printer portion 110 to perform a printing operation using the printer control module 421. Specifically, the job management APL 412 transmits image data stored in the RAM 202 to the printer I/F 204, and the printer portion 110 having received the image data prints an image on a paper in accordance with the image data. On this occasion, the image processing portion 220 is also used when any image processing or correction is needed.

Figure 6B:
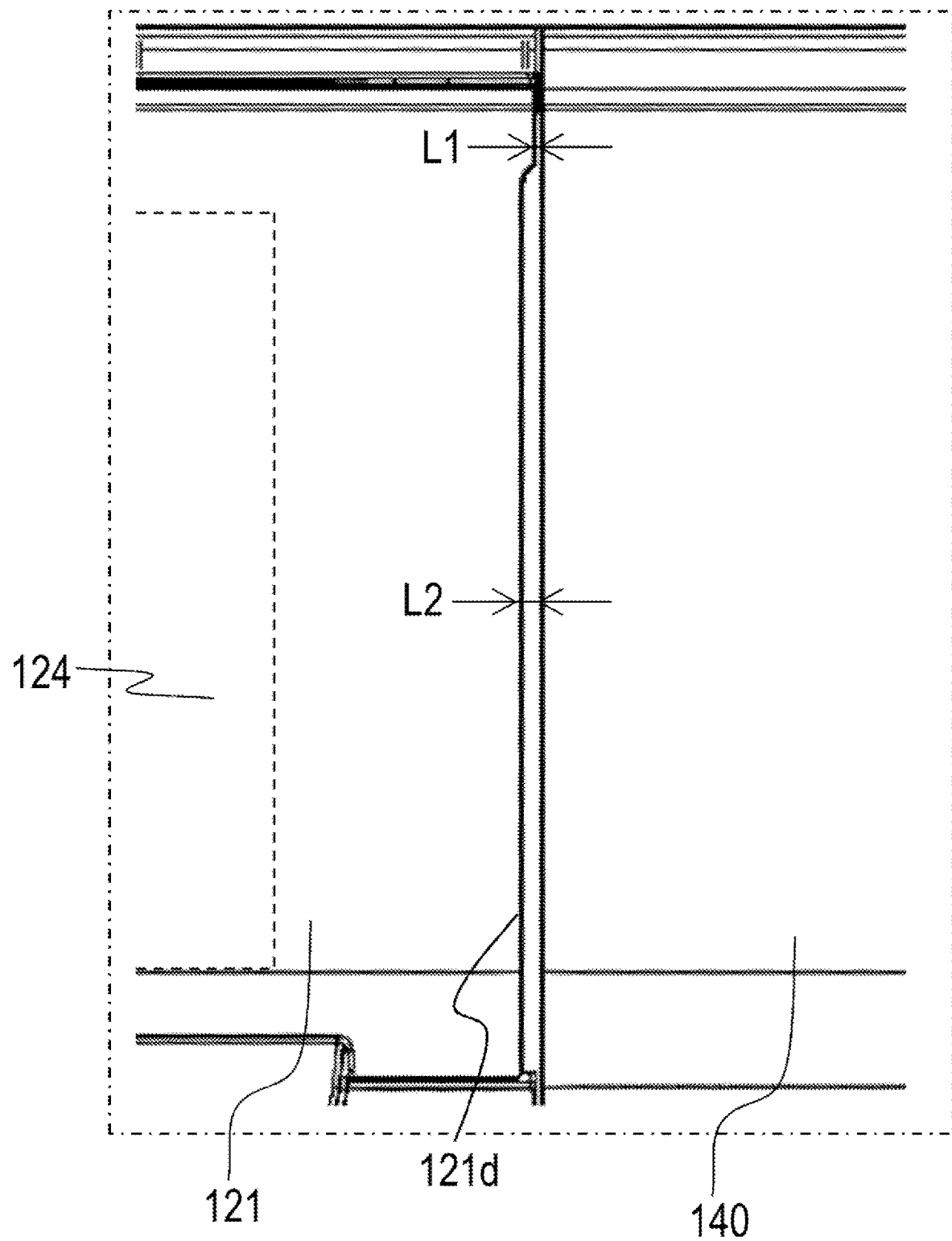
FIG. 6B is a top view of the MFP according to Example 1.

FIG. 6A is a top view of the MFP 100 with the scanner cover 121 and the exterior member 140 closed. FIG. 6B is an enlarged view of a range A surrounded by broken lines in FIG. 6A. Here, in this Example, a side on which the hinge portions 123 of the scanner cover 121 are provided with respect to the contact glass 124 shows a Y+ side, and a side on which the operation portion 131 is provided opposing the hinge portions 123 shows a Y− side. Further, a side on which the exterior member 140 is provided with respect to the contact glass 124 shows an X+ side, and a side opposing the exterior member 140 shows an X− side. Further, the supporting member 125 is not shown to make the figures easily understood.

The scanner cover 121 is provided to be rotatable about a rotational axis extending along a sub-scanning direction by the hinge portions 123 on one side (the Y+ side) in the Y direction of the contact glass 124 on the upper surface of the MFP 100. The scanner cover 121 is a substantially rectangular plate-shaped member, and its outer peripheral edge has a pair of first opposing sides extending parallel to a main scanning direction (second direction) in which elements provided in the reading portion are arranged and a pair of second opposing sides extending parallel to the sub-scanning direction (first direction) in which the reading portion moves. The first opposing sides include a side (first side) close to the exterior member 140 and a side (fourth side) distant from the exterior member 140. The second opposing sides include a side (second side) close to the rotational axis and a side (third side) distant from the rotational axis. Among the four sides of the scanner cover 121, a side 121d that is the first side extending along the exterior member 140 is provided with a notch. Between the scanner cover 121 and the exterior member 140, gaps L1 and L2 separated in the X direction are formed.

The gap L1 that is a first gap is formed on a side closer to the rotational axis with respect to the gap L2 that is a second gap in the main scanning direction. In this Example, the end region of the side 121d that forms an angle with the side (second side) close to the rotational shaft of the scanner cover 121 forms the gap L1 with the edge of the exterior member 140. Further, a region other than the end region of the side 121d forms the gap L2 with the exterior member 140. The side 121d is farther separated in the X direction from the exterior member 140 in the gap L2 than in the gap L1.

The gap L1 is formed from the outside (Y+ side) of the contact glass 124 to the hinge portions 123 in the Y direction of the side 121d of the scanner cover 121 and set to oppose the exterior member 140 at a short distance in consideration of the manufacturing fluctuations, attachment errors, or the like of respective components. Thus, the scanner cover 121 and the exterior member 140 are visually recognizable as if they were formed by the surfaces of the same height and do not spoil the beauty.

The gap L2 is formed on the Y− side so as to be continuous with the gap L1 at the side 121d of the scanner cover 121. As will be described later, the gap L2 is set to be a gap of an about 5 mm in the X direction with respect to the edge of the exterior member 140 as a distance enabling a document to pass therethrough without being folded.

FIG. 7 is a top view of the MFP 100 with the scanner cover 121 opened and the exterior member 140 closed. Here, the scanner cover 121 is not shown to make the figure easily understood. As shown in FIG. 7, the scanner portion 120 has a movable reading unit 126 on the lower side of the contact glass 124.

The reading unit 126 is constituted as an optical unit of a Charge Coupled Device (CCD) system that irradiates a document placed on the contact glass 124 with light and receives light reflected from the document to read information on the document. In this Example, the reading unit 126 reads, with a plurality of optical elements arranged with a minute width along the main scanning direction shown by an arrow P1 (Y direction), an image in a one-line region having a prescribed reading width in an arrow P2 direction and extending in the main scanning direction. Then, the reading unit 126 moves by a prescribed reading width in the sub-scanning direction shown by an arrow P2 (X direction) with a motor not shown and reads a next region. By repeatedly performing this reading operation, the reading unit 126 reads an image of the whole document. The main scanning direction shown by the arrow P1 is a direction orthogonal to the rotational axis of the scanner cover 121 through the hinge portions 123, and the sub-scanning direction shown by the arrow P2 is a direction parallel to the rotational axis.

As shown in FIG. 7, places at which a document larger than the document platen is placed on the X+ side with respect to the contact glass 124 are the first inclination portion 125a, the flat surface portion 125c, and the second inclination portion 125b of the supporting member 125 and an upper surface that is the exterior surface of the exterior member 140.

Figure 8:
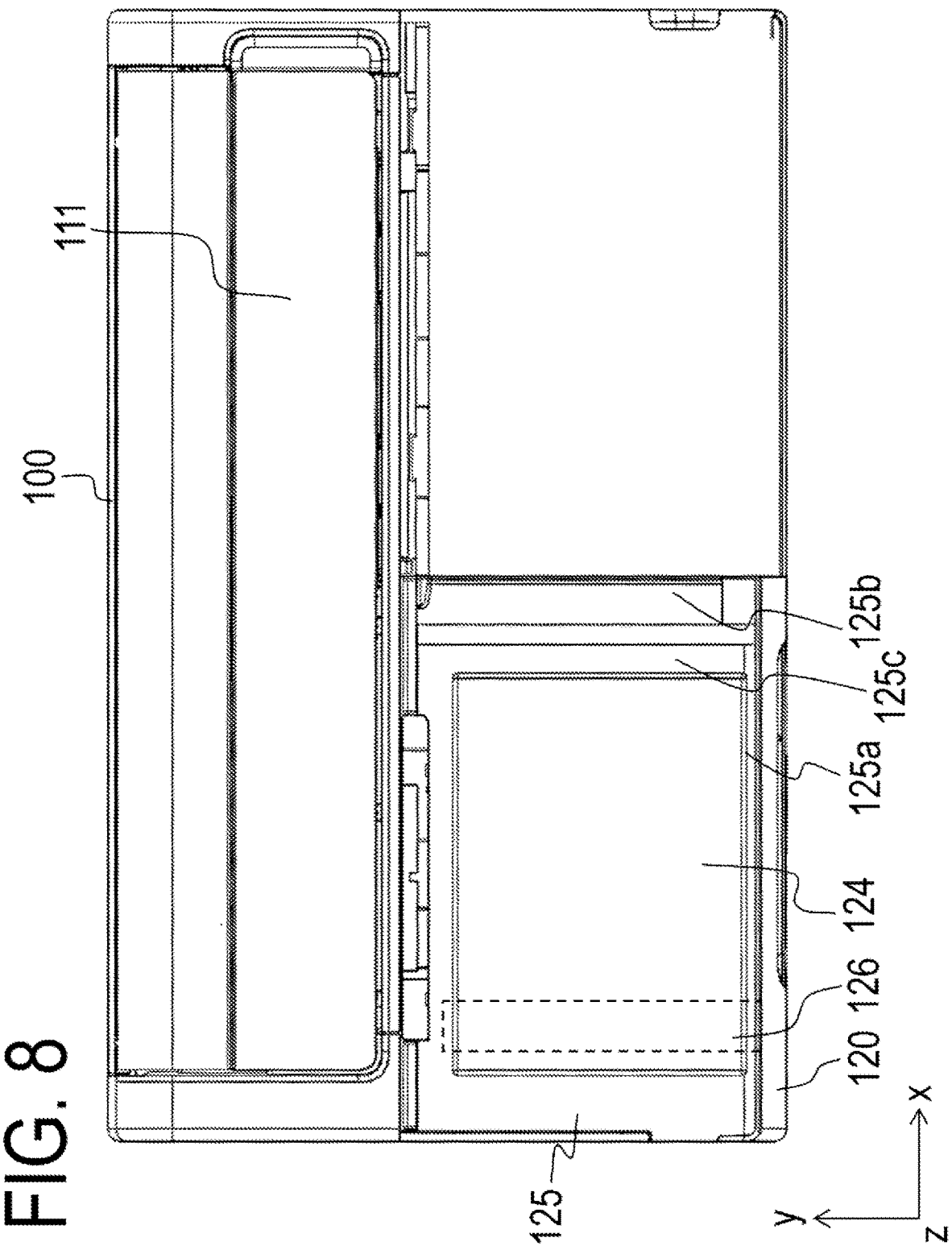
FIG. 8 is a top view of the MFP according to Example 1.

FIG. 8 is a top view of the MFP 100 with the scanner cover 121 and the exterior member 140 opened. Here, the scanner cover 121, the exterior member 140, and the printing portion inside the MFP 100 are not shown to make the figure easily understood. The exterior member 140 is configured to be openable and closable between a closed position at which the printing portion inside the MFP 100 is covered and an opening position at which the printing portion is exposed to the outside of the apparatus about a rotational axis parallel to the rotational axis of the scanner cover 121. In this Example, the rotational axis of the exterior member 140 and the rotational axis of the scanner cover 121 are substantially coaxial.

As shown in FIG. 8, places at which a document larger than the document platen is placed on the X+ side with respect to the contact glass 124 are the first inclination portion 125a, the flat surface portion 125c, and the second inclination portion 125b of the supporting member 125 since the exterior member 140 is not present. That is, the exterior member 140 is positioned (a place at which a document larger than the document platen is placed) adjacent to the contact glass 124 in the X direction at the closed position, and retracts from the adjacent position at the opening position. As will be described later, a hard document is not needed to be folded to be read when the exterior member 140 is opened.

FIG. 9A is a cross-sectional view of the MFP 100 taken along the line B-B in FIG. 6A with the scanner cover 121 closed and shows the scanner portion 120 and the exterior member 140 other than the reading unit 126 of the MFP 100. FIG. 9B is an enlarged view of a range E shown by dashed lines in FIG. 9A. FIG. 9C is a cross-sectional view of the MFP 100 taken along the line C-C in FIG. 6A and shown in an enlarged manner like FIG. 9B. FIG. 9D is a cross-sectional view of the MFP 100 taken along the line D-D in FIG. 6A and shows the scanner portion 120 and the exterior member 140 other than the reading unit 126 of the MFP 100.

As shown in FIGS. 9A, 9B, and 9D, a document 310 larger than the contact glass 124 (document platen) in three directions on the X+ side, X− side, and Y− side is abutted onto the step of the first inclination portion 125a on the side of the hinge portions 123 of the supporting member 125 and placed.

The bending portion 121b and the protruding portion 121c of the scanner cover 121 are formed on the sides along the outer shape of the MFP 100, have a bended shape or a protruding shape on the side of the contact glass 124, and prevent light from entering the reading unit 126 from the outside. Further, the bending portion 121b and the protruding portion 121c form a gap with the supporting member 125 and are configured so as to enable a document to pass therethrough as will be described later. The surfaces (respective upper surfaces) of the scanner cover 121 and the exterior member 140 when seen from the user in their closed states are substantially the same in height, maintain a sense of unity in terms of design, and prevent light from entering the reading unit 126 from the outside.

As shown in FIGS. 9B and 9C, the second inclination portion 125b of the supporting member 125 is gently higher toward the exterior member 140 from the flat surface portion 125c. Further, as shown in FIG. 9B, the highest place of the second inclination portion 125b is formed to be positioned between the edge of the scanner cover 121 and the edge of the exterior member 140 in the direction (X direction) in which the edge of the scanner cover 121 and the edge of the exterior member 140 that form the gap L2 oppose each other. That is, the second inclination portion 125b extends up to a position closer to the exterior member 140 than the scanner cover 121 in the opposing direction. Accordingly, when the MFP 100 is seen from above, the highest place of the second inclination portion 125b is exposed to the outside via the gap L2. Note that the second inclination portion 125b of the supporting member 125 is formed up to the middle of the gap L1 in the Y direction as shown in FIG. 9C. However, the second inclination portion 125b may be formed up to a range in which the gap L2 through which a document passes is formed, and the gap L1 may be a flat surface portion.

A region in the document 310 that falls within the range of the white sheet 122 of the scanner cover 121 is brought into press-contact with the surface of the contact glass 124. A region in the document 310 that is not placed on the contact glass 124 and falls outside the white sheet 122 is placed on the first inclination portion 125a and the flat surface portion 125c of the supporting member 125 by its own weight.

As shown in FIG. 9A, a region in the document 310 that is arranged on the X− side with respect to the contact glass 124 passes through the gap between the flat surface portion 125c of the supporting member 125 and the bending portion 121b of the scanner cover 121 and is fed to the outside of the MFP 100 without being folded.

As shown in FIG. 9D, a region in the document 310 that is arranged on the Y− side with respect to the contact glass 124 also similarly passes through the gap between the flat surface portion 125c of the supporting member 125 and the protruding portion 121c of the scanner cover 121 and is fed to the outside of the MFP 100 without being folded.

A region in the document 310 that is arranged on the X+ side with respect to the contact glass 124, that is, a region in the document 310 that is arranged on the side of the exterior member 140 of the MFP 100 is placed on the second inclination portion 125b of the supporting member 125 by its own weight, passes through the gap L2 between the scanner cover 121 and the exterior member 140, and is fed to the outside of the MFP 100 in contact with the corner part of the exterior member 140. Since the gap L2 wider in the X direction than the gap L1 is provided between the scanner cover 121 and the exterior member 140 as described above, a document larger than the document placement region of the contact glass 124 is not needed to be folded when read. Further, the second inclination portion 125b is provided on the side of the supporting member 125 along the exterior member 140 so that its highest place is positioned between the scanner cover 121 and the exterior member 140. Thus, the document 310 is raised to the side of the scanner cover 121 and fed close to the gap between the scanner cover 121 and the exterior member 140. Accordingly, the document 310 is enabled to easily pass through the gap between the scanner cover 121 and the exterior member 140. Therefore, the number of gaps is reduced, which prevents the beauty from being impaired. In addition, since the exterior member 140 is arranged close to the scanner cover 121, it is possible to miniaturize the MFP 100.

FIG. 10 is a cross-sectional view of the MFP 100 taken along the line B-B in FIG. 6A with the scanner cover 121 closed and the exterior member 140 opened. Accordingly, FIG. 10 shows the scanner portion 120 other than the reading unit 126 of the MFP 100 and does not show the exterior member 140. As shown in FIG. 10, a document 320 larger than the contact glass 124 is placed. The document 320 is shown as being made of a material harder than that of the document 310 of FIGS. 9A to 9D. The descriptions of the portions of FIG. 10 overlapping the portions of FIGS. 9A to 9D will be omitted.

The document 320 on the side of the exterior member 140 of the MFP 100 that is positioned on the X+ side with respect to the contact glass 124 is placed on the second inclination portion 125b of the supporting member 125 by its own weight, passes through the gap between the scanner cover 121 and the second inclination portion 125b, and is fed to the outside of the MFP 100. As described above, when a document made of a hard material or a document including a plurality of sheets is read, the document 320 does not contact the corner part of the exterior member 140 and is not needed to be folded with the exterior member 140 opened.

Example 2

Figure 11:
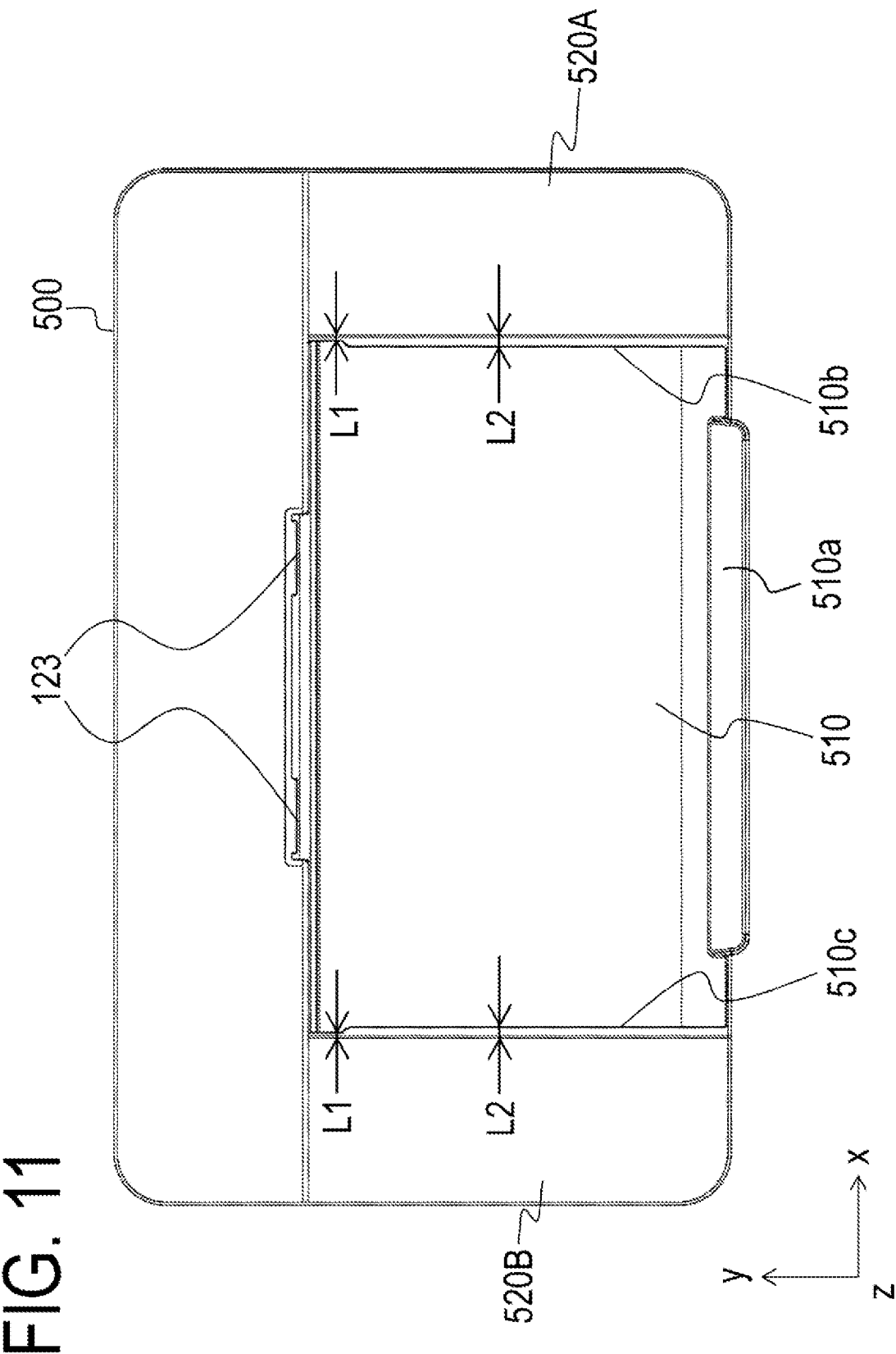
FIG. 11 is a top view of an MFP according to Example 2.

In an MFP 500 according to Example 2 of the present invention, exterior members 520 (520A and 520B) are provided on both sides of a scanner portion in the subscanning direction of a reading unit that is an X direction as shown in FIG. 11. Note that configurations common to Example 1 will be denoted by the same symbols, and their duplicated descriptions will be omitted in this Example.

FIG. 11 is a top view of the MFP 500 with a scanner cover 510 closed. As shown in FIG. 11, the scanner cover 510 that is supported by hinge portions 123 and openable and closable is provided on the upper surface of the MFP 500. The scanner cover 510 is provided with a gripping portion 510a, and the gripping portion 510a protrudes to a front side so that a user easily inserts his/her hand and raises the scanner cover 510. A side 510b along the exterior member 520A among four sides constituting the rectangular outer peripheral edge of the scanner cover 510 is provided with a notch, and a gap L1 and a gap L2 are formed in an X direction between the scanner cover 510 and the exterior member 520A. Similarly, a side 510c along the exterior member 520B among the four sides constituting the rectangular outer peripheral edge of the scanner cover 510 is provided with a notch, and a gap L1 (third gap) and a gap L2 (fourth gap) are formed in the X direction between the scanner cover 510 and the exterior member 520B. The gap L2 is longer than the gap L1 and set at about 5 mm. The positions of the notches in a Y direction are the same between the side 510b and the side 510c and arranged symmetrical to each other so as not to impair the beauty.

Figure 12:
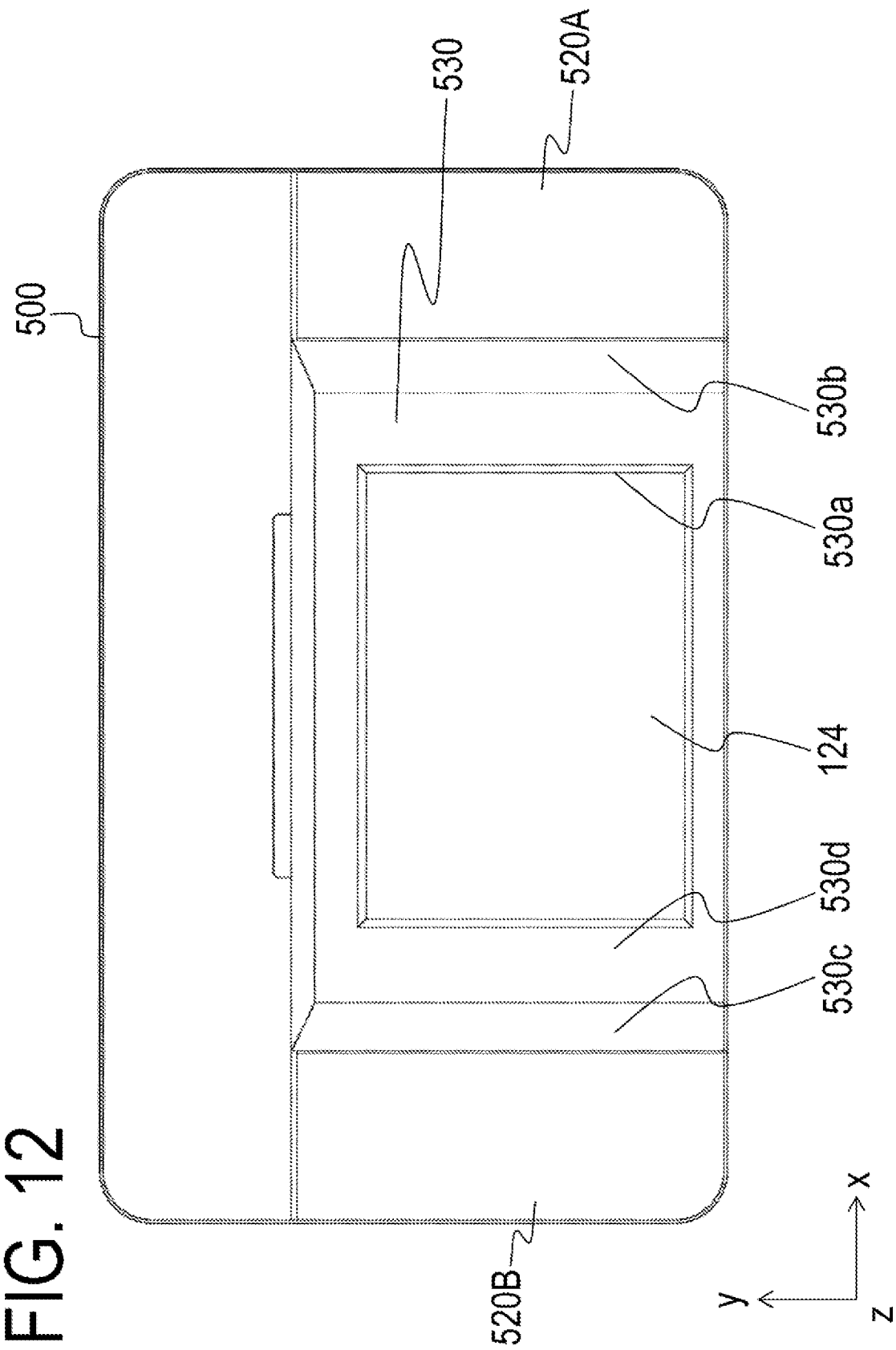
FIG. 12 is a top view of the MFP according to Example 2.

FIG. 12 is a top view of the MFP 500 with the scanner cover 510 opened. Here, the scanner cover 510 is not shown to make the figure easily understood. A supporting member (frame member) 530 constituting the outer frame of a contact glass 124 includes a first inclination portion 530a on a side contacting the contact glass 124. Further, the supporting member 530 includes a second inclination portion 530b on a side along the exterior member 520A and a second inclination portion 530c serving as a third inclination portion on a side along the exterior member 520B. Further, the supporting member 530 includes a flat surface portion 530d parallel to the document placement surface of the contact glass 124 between the first inclination portion 530a and the second inclination portions 530b and 530c.

When a document larger than the contact glass 124 is read, the range of the document protruding from a document platen in the X direction is placed on the second inclination portions 530b and 530c of the supporting member 530. Then, the document passes through the gaps L2 between the scanner cover 510 and the exterior members 520A and 520B, and is fed to the outside of the MFP 500 in contact with the corner parts of the exterior members 520A and 520B. The portions of the document that are fed to the outside of the MFP 500 via the gaps L2 are placed on the upper surface (first surface) of the exterior member 520A and the upper surface (second surface) of the exterior member 520B by their own weights.

In an MFP including exterior members at both ends of a document platen as well, gaps are formed between a scanner cover and the exterior members as described above, whereby a document larger than a contact glass is not needed to be folded when read.

Note that each of the exterior members 520A and 520B of the MFP 500 of this Example may be configured to be openable and closable like the exterior member 140 of the MFP 100 of Example 1.

Example 3

Figure 13:
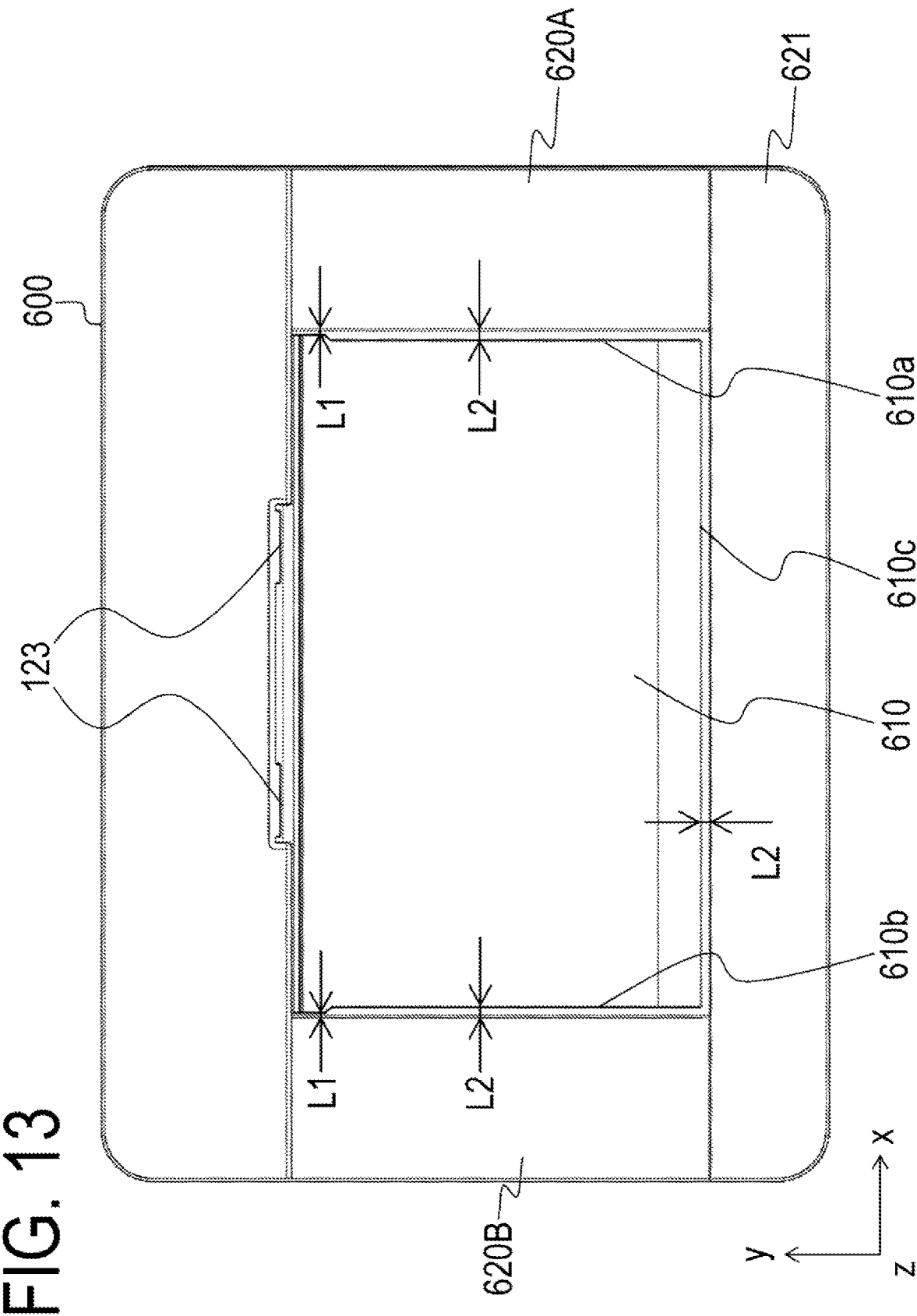
FIG. 13 is a top view of an MFP according to Example 3.

As shown in FIG. 13, an MFP 600 according to Example 3 of the present invention includes first exterior members 620 and a second exterior member 621 along three sides other than a side having hinge portions 123 of a scanner cover 610. Note that configurations common to Example 1 will be denoted by the same symbols, and their duplicated descriptions will be omitted in this Example.

FIG. 13 is a top view of the MFP 600 with the scanner cover 610 closed. As shown in FIG. 13, the scanner cover 610 that is supported by the hinge portions 123 and openable and closable is provided on the upper surface of the MFP 600. A side 610a toward a Y direction along a first right exterior member 620A among four sides constituting the rectangular outer peripheral edge of the scanner cover 610 is provided with a notch, and a gap L1 and a gap L2 are formed in an X direction between the scanner cover 610 and the first right exterior member 620A. Similarly, a side 610b along a first left exterior member 620B among the four sides constituting the rectangular outer peripheral edge of the scanner cover 610 is provided with a notch, and a gap L1 (third gap) and a gap L2 (fourth gap) are formed in the X direction between the scanner cover 610 and the first left exterior member 620B. The gap L2 is longer than the gap L1 and set at about 5 mm. The positions of the notches in the Y direction are the same between the side 610a and the side 610b and arranged symmetrical to each other so as not to impair the beauty.

Further, a gap L2 (fifth gap) is formed in the Y direction between a side 610c along the second exterior member 621 of the scanner cover 610 and the second exterior member 621. The gaps between the three sides 610a, 610b, and 610c of the scanner cover 610 and the respective exterior members 620A, 620B, and 621 are set at the same distance so as not to impair the beauty.

Figure 14:
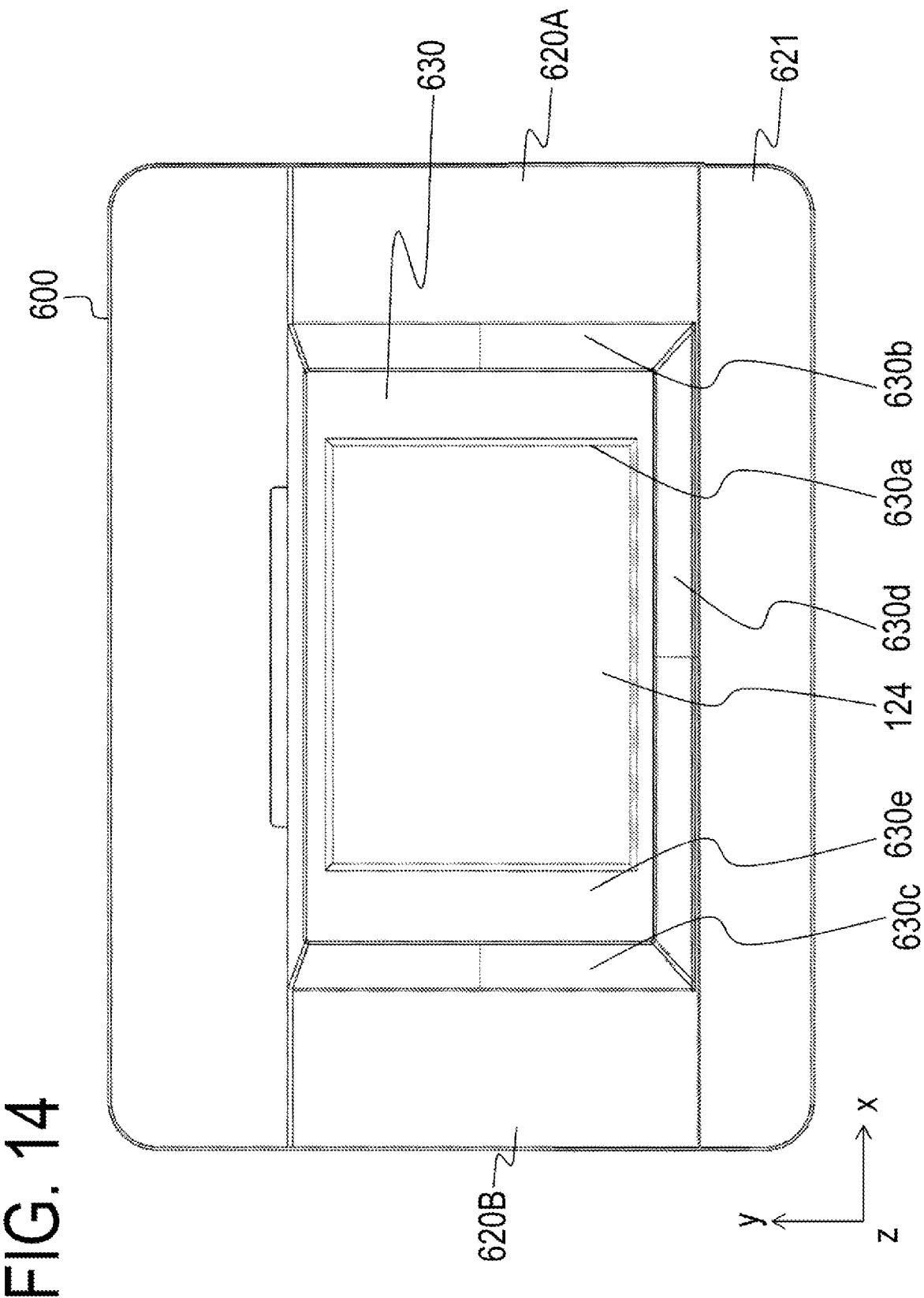
FIG. 14 is a top view of the MFP according to Example 3.

FIG. 14 is a top view of the MFP 600 with the scanner cover 610 opened. Here, the scanner cover 610 is not shown to make the figure easily understood. A supporting member 630 constituting the outer frame of a contact glass 124 includes a first inclination portion 630a on a side contacting the contact glass 124. Further, the supporting member 630 includes a second inclination portion 630b on a side along the first right exterior member 620A and a second inclination portion 630c serving as a third inclination portion on a side in the Y direction along the first left exterior member 620B. Further, the supporting member 630 includes a third inclination portion 630d serving as a fourth inclination portion on a side in the X direction along the second exterior member 621. Further, the supporting member 630 includes a flat surface portion 630e parallel to the document placement surface of the contact glass 124 between the first inclination portion 630a and the second inclination portions 630b and 630c and the third inclination portion 630d. The highest places of the second inclination portions 630b and 630c are formed below the gaps L2 between the scanner cover 610 and the first exterior members 620. The highest place of the third inclination portion 630d is formed below the gap L2 between the scanner cover 610 and the second exterior member 621.

When a document larger than the contact glass 124 is read, the range of the document protruding from a document platen is placed on the second inclination portions 630b and 630c and the third inclination portion 630d of the supporting member 630. Then, the document passes through the gaps L2 between the scanner cover and the respective exterior members, and is fed to the outside of the MFP in contact with the corner parts of the respective exterior members. The portions of the document that are fed to the outside of the MFP 600 via the gaps L2 are placed on the upper surface (first surface) of the first right exterior member 620A, the upper surface (second surface) of the first left exterior member 620B, and the upper surface (third surface) of the second exterior member 621 by their own weights.

In an MFP including exterior members on three sides other than a side on which hinge portions are provided of a scanner cover as well, gaps are formed between the scanner cover and the exterior members as described above, whereby a document larger than a contact glass is not needed to be folded when read.

Note that the exterior member is divided into the two exterior members of the first exterior member and the second exterior member in this Example. However, an integrated exterior member may be formed along three sides other than a side on which the hinge portions of a scanner cover are provided.

Further, each of the exterior members 620A and 620B of the MFP 600 of this Example may also be configured to be openable and closable like the exterior member 140 of the MFP 100 of Example 1.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-019517, filed on Feb. 10, 2022, which is hereby incorporated by reference herein in its entirety.

What is claimed is:
1. A reading apparatus comprising:
a document platen on which a document is placed;
a reading portion configured to read the document placed on the document platen;

a cover that is openable and closable between a first position at which the document platen is covered and a second position at which the document platen is uncovered; and a frame member including a first inclination portion and a second inclination portion, configured to constitute at least a part of an outer frame of the document platen, the first inclination portion being adjacent to the document platen and higher with an increasing distance from the document platen, and the second inclination portion being arranged farther away from the document platen than the first inclination portion and higher with an increasing distance from the document platen.

2. The reading apparatus according to claim 1, wherein the frame member has a surface, which is parallel to the document platen, between the first inclination portion and the second inclination portion.

3. The reading apparatus according to claim 1, further comprising:
an exterior member provided adjacent to the second inclination portion of the frame member.

4. The reading apparatus according to claim 3, wherein a gap is formed between the cover at the first position and the exterior member.

5. The reading apparatus according to claim 4, wherein the gap includes a first gap and a second gap wider than the first gap.

6. The reading apparatus according to claim 5, wherein the cover is provided to be rotatable about a rotational axis extending in a first direction in which the reading portion moves, and
the first gap is closer to the rotational axis than the second gap in a second direction crossing the first direction.

7. The reading apparatus according to claim 4, wherein a part of the second inclination portion is exposed from the gap.

8. The reading apparatus according to claim 3, wherein the exterior member is configured to be movable so as to retract from a position adjacent to the frame member.

9. The reading apparatus according to claim 3, wherein an upper surface of the exterior member is at a substantially same height as an upper surface of the cover at the first position.

10. The reading apparatus according to claim 1, wherein the frame member is provided so as to surround an outer periphery of the document platen with the first inclination portion.

11. A reading apparatus comprising:
a document platen on which a document is placed;
a reading portion configured to read the document placed on the document platen;
a cover that is openable and closable between a first position at which the document platen is covered and a second position at which the document platen is uncovered;

a frame member configured to constitute at least a part of an outer frame of the document platen; and
an exterior member provided adjacent to the frame member and provided so as to form a gap with the cover at the first position, the exterior member being configured to support the document in a state where the document placed on the document platen is exposed through the gap.

12. The reading apparatus according to claim 11, wherein a part of the frame member is exposed from the gap.

13. The reading apparatus according to claim 11, wherein the frame member has an inclination portion higher with an increasing distance from the document platen.

14. The reading apparatus according to claim 11, wherein an upper surface of the exterior member is at a substantially same height as an upper surface of the cover at the first position.

15. The reading apparatus according to claim 11, wherein the exterior member is configured to be movable so as to retract from a position adjacent to the frame member.

16. A printing apparatus comprising:
a document platen on which a document is placed;
a reading portion configured to read the document placed on the document platen;
a printing portion configured to print an image read by the reading portion;
a cover that is openable and closable between a first position at which the document platen is covered and a second position at which the document platen is uncovered; and
a frame member including a first inclination portion and a second inclination portion, configured to constitute at least a part of an outer frame of the document platen, the first inclination portion being adjacent to the document platen and higher with an increasing distance from the document platen, and the second inclination portion being arranged farther away from the document platen than the first inclination portion and higher with an increasing distance from the document platen.

17. The printing apparatus according to claim 16, further comprising:
an exterior member provided adjacent to the second inclination portion of the frame member.

18. The printing apparatus according to claim 17, wherein the exterior member is openable and closable between a position at which an inside of the printing apparatus is exposed and a position at which the inside of the printing apparatus is not exposed.

19. The printing apparatus according to claim 17, wherein an upper surface of the exterior member is at a substantially same height as an upper surface of the cover at the first position.

20. The printing apparatus according to claim 17, wherein a gap is formed between the cover at the first position and the exterior member.

* * * * *